United States Patent [19]

Steinwart et al.

[11] 4,169,452
[45] Oct. 2, 1979

[54] FUEL INJECTION ROTARY PISTON INTERNAL COMBUSTION ENGINE OF THE TROCHOIDAL TYPE

[75] Inventors: Johannes Steinwart, Obersulm-Willsbach; Peter Will, Bad Rappenau, both of Fed. Rep. of Germany

[73] Assignee: Audi Nsu Auto Union Aktiengesellschaft, Fed. Rep. of Germany

[21] Appl. No.: 835,492

[22] Filed: Sep. 22, 1977

[30] Foreign Application Priority Data

Sep. 22, 1976 [DE] Fed. Rep. of Germany ....... 2642487

[51] Int. Cl.² .............................................. F02B 53/10
[52] U.S. Cl. .................................... 123/206; 123/207; 123/208
[58] Field of Search .................... 123/206, 207, 208

[56] References Cited

U.S. PATENT DOCUMENTS 3,126,876  3/1964  Kimberley ................... 123/208 X

FOREIGN PATENT DOCUMENTS 1027787  4/1966  United Kingdom ................. 123/206

Primary Examiner—Michael Koczo
Attorney, Agent, or Firm—Kane, Dalsimer, Kane, Sullivan and Kurucz

[57] ABSTRACT

The invention relates to a fuel injection rotary piston internal combustion engine of the trochoidal type with a housing made up of a peripheral portion and two side walls and with a first injection nozzle in the peripheral portion and a second injection nozzle in the inlet port, which are connected to a fuel metering device and of which the delivery quantities are adjustable. A fuel delivery device continuously injects a quantity of fuel proportional to the air intake and is in permanent communication with the first nozzle. Control means connect the second nozzle to the fuel delivery device only from a predetermined part-load up to full load conditions.

5 Claims, 3 Drawing Figures

FUEL INJECTION ROTARY PISTON INTERNAL COMBUSTION ENGINE OF THE TROCHOIDAL TYPE

BACKGROUND OF THE INVENTION

In a fuel injection rotary piston internal combustion engine of the kind described it is known (German AS No. 1201 608) for different quantities of fuel to be injected within the load range between idling and full load from a first injection nozzle mounted in the peripheral portion and a second nozzle mounted in the inlet port, in order to maintain a well-formed mixture permanently in particular in the region of the spark plug. However as in this arrangement both injection nozzles are permanently in action, despite the delivery of to some extent minimal quantities of fuel it cannot be avoided that under idling conditions and in the lower partial load range as well as after a cold start there is some depositing of fuel on the walls of the inlet port and in the working chambers. Such deposits of fuel can for example penetrate past the seal elements and, as a consequence, interfere with the functioning of these elements. However, this has a particularly disadvantageous effect in its influence on the quality of the exhaust gas. Moreover the fuel injection pump which is provided for metering the delivery of fuel, including the control means necessary for varying the delivery, represents a relatively high outlay in cost.

From U.S. Pat. No. 3,126,876 and German published Specification No. 1,751,205 it is known to mount an injection nozzle in the peripheral portion in the neighbourhood of an inlet port that opens into the side wall. As explained in the above mentioned U.S. specification this layout makes it possible to employ, instead of a fuel metering device that operates at high pressure, a more economical device which operates at low pressure. Furthermore it has been proposed in this U.S. Pat. No. 3,126,876 and also in German Pat. No. 1,751,205 to surround the injection orifice of the nozzle with at least one air opening so that the fuel that is injected can mix either with the combustion air introduced from atmosphere to this opening or with a combustion mixture, allowing one to obtain an improved mixture formation and a higher efficiency. As has been found in practice the advantage that can be obtained by this layout shows itself, however, only under idling and light load conditions whereas at high speeds and in the operating range extending above the lower part of the load range, as well as at full load, the time available is too short for adequate mixture formation.

SUMMARY OF THE INVENTION

The invention is based on solving the problem of providing a fuel injection rotary piston engine of the kind stated in the introduction above, in which an improved mixture formation is achieved whilst largely avoiding deposition of fuel at any part of the load range. This problem is solved according to the invention in that the first injection nozzle is mounted at a point in the peripheral portion which lies permanently in the neighbourhood of the working chamber undergoing the induction phase and it is in the form of an air shield nozzle of which the air shield has a cross-sectional area corresponding largely to the air requirements under idling conditions, and that a fuel delivery device, known in itself, for continuous injection of a quantity of fuel proportional to the air intake is in permanent communication with the first nozzle, and that there is provided a control device which connects the second nozzle to the fuel delivery device from a predetermined part-load up to full load conditions.

By virtue of the proposal according to the invention, in which the fuel at idling and in the lower part of the load range is delivered by the first injection nozzle in the peripheral wall and in the range going beyond this it is delivered in addition to the second nozzle, a good mixture formation can be achieved in the entire load range and deposits of fuel on the inner surfaces of the housing and in the induction port are largely avoided. This advantage is achieved at idling and in the lower part of the load range as the fuel is injected directly into the working chamber and comes in direct contact with the hot piston opposite the surrounding components of the housing, the fuel being swirled and mixed with the air which flows in from the air shield at the injection orifice and with the induction air which is drawn in and flows in the same direction. Only as the load increases is the quantity of fuel which grows to an increasing extent injected through the further second nozzle, this fuel being mixed together in the induction port with the incoming air which is flowing very rapidly under these load conditions, so the fuel enters the working chamber in a thoroughly atomised condition. As the fuel is distributed by a fuel feeding device which always delivers a quantity of fuel substantially proportional to the quantity of air drawn in, no transfer error can arise in the operation of the control device and the introduction of the second injection nozzle. With cutting off, equal in time, in the working chamber, of the first injection nozzle and of the or each inlet port with a second injection nozzle, the nozzles are exposed to the depression that permanently prevails, in this region, of the chamber that is undergoing the induction phase, with a flow which is always directed towards the chamber, so that no change of direction can influence the incoming fuel-/air mixture and no fuel deposits can arise. This layout largely makes possible the use of a fuel delivery device operating at low pressure, which in contrast to an injection installation working at high pressure, is not only more economical but also gives better scope for mixture weakening and accordingly a lower consumption and a reduction of the polluting elements in the exhaust gas. Moreover by the possibility of avoiding fuel deposits on the inner surfaces of the housing no fuel residues can penetrate past the sealing elements into the lubricant.

The fuel injection rotary piston internal combustion engine can be constructed so that, in a manner known in itself, there is an inlet port provided in each of the side walls, and the second injection nozzle is provided in one of these inlet ports whilst the other inlet port carries air alone. With this layout the second nozzle can be advanced relatively far in the direction towards the chamber undergoing the induction phase, and so any possible occurrence of fuel deposits in the inlet port can be largely eliminated.

When constructional requirements dictate it, it is however also possible for an inlet port to be provided, in a manner known in itself, in each of the side walls and for the two inlet passages to branch from a common induction pipe, and for the second injection nozzle to be mounted at or upstream of the branch point in the pipe.

The control device provided for bringing in the second nozzle can comprise a control valve actuated in accordance with load and/or speed. With load-dependent control the valve can for example be coupled to a throttle valve mounted in the induction pipe or with throttle valves mounted in each of the inlet ports.

In order to achieve good formation of mixture from the fuel injected into the working chamber from the first nozzle and in order to obtain the possibility of controlling the fuel/air ratio at idling, the air shield around the first nozzle can have a cross-section representing about 80% of the idling air requirements. To produce the necessary combination of the idling mixture for operation the remaining quantity of air can be introduced into the inlet port or induction pipe through the throttle valve.

The first injection nozzle or the fuel pipe leading to it can be arranged so that it passes a quantity of fuel corresponding to about 50% to 70% of the full load requirement. In this way it is possible to ensure that the delivery of fuel to be made below this value is injected through the first nozzle and above this value it is distributed to both of the nozzles.

BRIEF DESCRIPTION OF THE DRAWINGS

Further features and details of the invention are disclosed in the following description in conjunction with the drawings in which there is illustrated an embodiment of the invention by way of example. In the drawings.

DETAILED DESCRIPTION

Figure 1:
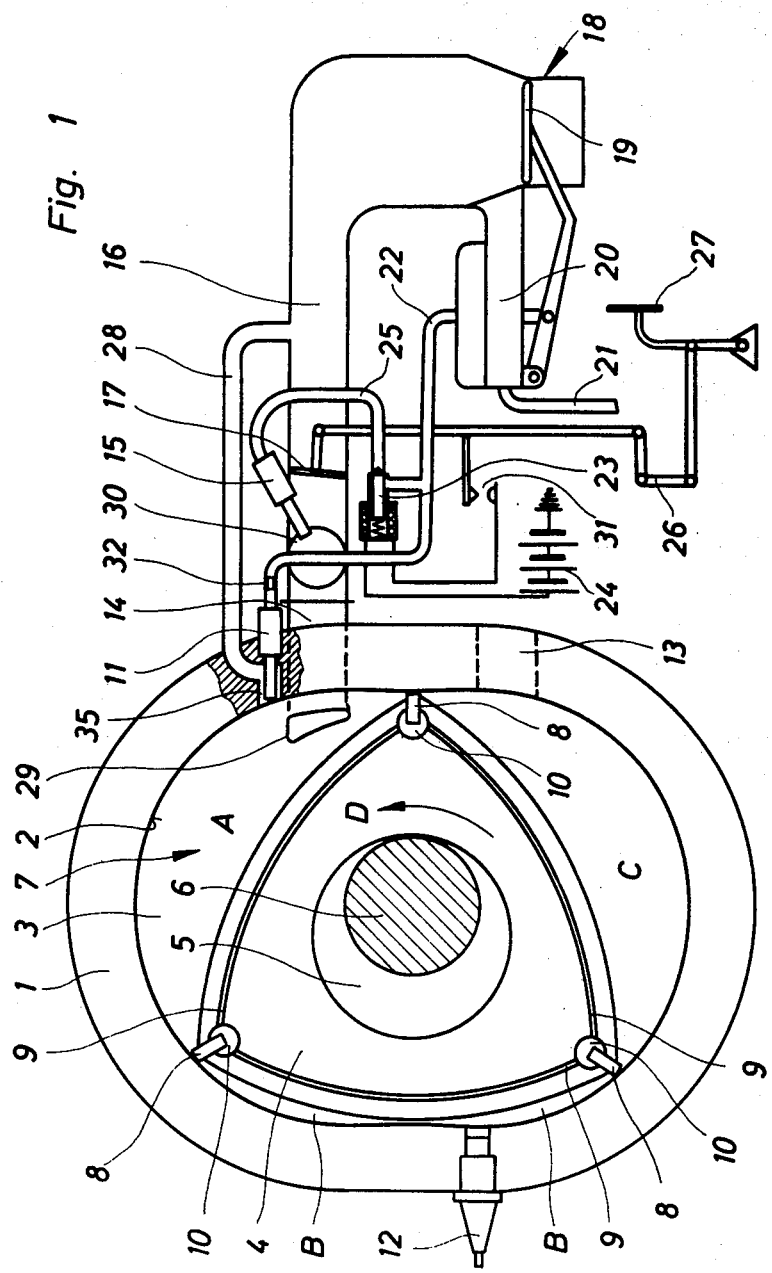
FIG. 1 is a diagrammatic illustration of a fuel injection rotary piston internal combustion engine with a fuel delivery device, the nearer side wall having been removed and the housing being shown partly in section.

We refer first to FIG. 1 in which a rotary piston engine of the trochoidal type is illustrated diagrammatically and comprises a housing made up of a peripheral portion 1 having a two-lobed inner running surface 2 and parallel side walls 3 and in which a three-cornered piston 4 is rotatably mounted on an eccentric 5 on an eccentric-carrying shaft 6. The piston 4 is provided with sealing elements which are in sliding engagement with the inner surfaces of the housing, these surfaces being formed by the sides 7 of the side walls 3 and by the running surface 2 of the peripheral portion. The sealing elements of the piston 4 comprise both apex seals 8 which are radially movable in the apices of the piston 4 and also side sealing strips 9 which extend between adjacent apex seals 8 and are connected to them by link blocks 10, the strips 9 and the blocks 10 being mounted to be axially movable in each face of the piston 4 and being resiliently urged against the faces 7 of the side walls 3. As the piston 4 rotates in the direction of the arrow D the apex seals 8 are in continuous sliding engagement with the inner surface 2 of the peripheral portion to define working chambers A, B and C of varying volume. To perform a 4-phase cycle in each of the chambers there are provided in the peripheral portion 1 a first injection nozzle 11, at least one spark plug 12 and an exhaust port 13 and in each side wall 3 there is an inlet port 14 with a second injection nozzle 15 mounted in the transverse passage of a branch piece 30 connecting the ports 14 to an induction pipe 16. As the piston 4 rotates each working chamber A, B, C performs successively an induction, compression, expansion and exhaust phase, and with the piston 4 in the position shown in the drawing the chamber A is undergoing the induction phase, the chamber B is at the start of the expansion phase and the chamber C is in the exhaust phase.

Each inlet passage 14 opens into a respective inlet port or control opening 29 in the face 7 of the side wall 3 and via the induction pipe 16 joined to the branch piece 30 and in which there is a throttle valve 17, it is in communication with a known fuel delivery device 18 for continuous fuel injection. The fuel delivery device 18, which comprises substantially an air flow measuring device 19 and a fuel metering device 20, is fed with fuel through a pipe 21.

The first injection nozzle 11 is mounted in the peripheral portion 1 in such a way that it is cut off by the piston 4 at the latest at the instant of closing of the or each inlet port 29 from the chamber that is undergoing the induction phase. The injection orifice of the first nozzle 11 is surrounded by an air shield 35 which has a cross-sectional area for flow corresponding substantially to the requirements at idling and is connected to the induction pipe 16 through an air pipe 28. By this layout the fuel injected through the nozzle 11 can become mixed with the combustion air entering through the air shield 35 and a thoroughly prepared and ignitable mixture is formed in the working chamber directly following the injection orifice, this mixture being directed towards the piston 4 without coming into contact with the inner surfaces of the housing.

When the engine is running the fuel delivery device 18 delivers through a fuel pipe 22 a quantity of fuel to the first nozzle 11 substantially proportional to the quantity of air drawn in through the induction pipe 16 and the air passage 28. Branching off from the fuel pipe 22 there is a further fuel pipe 25 which leads through a control valve 23 to the second injection nozzle 15. The valve 23, which in the present example is in the form of a magnetic valve, is in its turn connected to a current supply 24 and to a switch 31. The control valve 23 can however also, in contrast to what is shown, be mounted directly on the second nozzle 15. The switch 31 is actuated by a linkage 26 that connects the accelerator pedal 27 to the throttle valve 17. When the switch 31 is open, i.e. no current is passing, the control valve 23 is shut off and so the fuel that is supplied goes solely to the first injection nozzle 11. The switch 31 is adjusted so that it also still remains open when the throttle valve 17 is shifted away from the idling range and takes up a position corresponding to the part-load range. In this range additional air for combustion is drawn in past the throttle valve 17 and through the inlet passages 14 into the working chamber and the first injection nozzle 11 receives from the delivery device 18 a quantity of fuel which is increased substantially in proportion. Only when the throttle valve 17 is opened further, going beyond the lower portion of the part-load range, for example of 50 to 70% of full load, is the linkage 26 moved beyond a predetermined point into a region in which the switch 31 is closed. This results in the path for flow to the pipe 25 being opened by the valve 23 and the second nozzle 15 also comes into action. From this load range onwards the quantity of fuel supplied by the device 18 is distributed from both the first injection nozzle 11 and the second nozzle 15.

In order to ensure that when both nozzles 11 and 15 are in action at least the quantity of fuel going beyond the 50 to 70% full load demand is injected through the second nozzle 15 a throttle point or restriction 32 can be provided in the part of the fuel pipe 22 downstream of the branching-off point of the pipe 25.

Control of the control device in accordance with both load and speed can be obtained, in contrast to the embodiment shown, by arranging that a light beam device, not shown, responding to the position of the air quantity measuring device 19 or a contact actuated by a permanent magnet cooperates with the valve 23.

By virtue of the arrangement proposed, with the injection nozzles 11 and 15 in the region of the chamber undergoing the induction phase, and the distribution of the fuel delivery to both nozzles, it is possible both in the idling and lower part load range and also in the load range above this, to obtain effective mixture formation and to prevent to a large extent any deposits of fuel in the housing, resulting in a reduction in the fuel consumption and an improvement in the quality of the exhaust gas.

Figure 2:
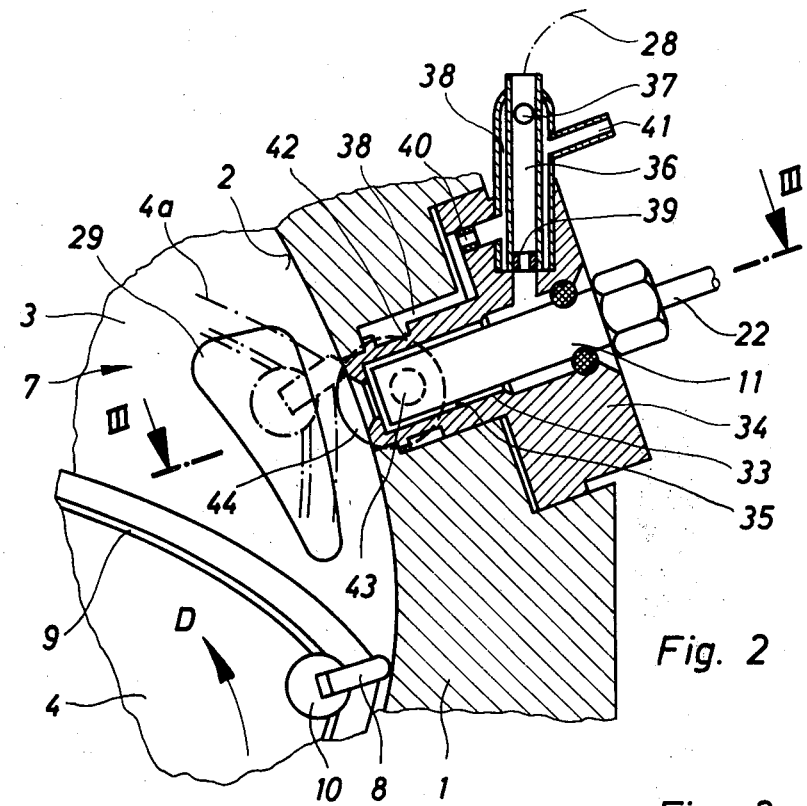
FIG. 2 shows part of a cross section through the housing of the engine of FIG. 1, to a larger scale.

In the part of the housing of FIG. 1 shown in section in FIG. 2 to a larger scale there is illustrated the first injection nozzle 11 which is mounted in the neighbourhood of the chamber that undergoes the induction phase so that with the piston 4 rotating in the direction of the arrow D it is cut off from the chamber in question at the latest at the instant when the inlet port 29 is closed, corresponding to the position 4a of the piston 4, shown in broken lines. By virtue of this layout there is present, in the neighbourhood of those orifices of the nozzle 11 that are directly adjacent to the running surface 2, a flow which is always directed towards the working chamber.

With this layout, however, a problem arises with regard to the lubrication of the sealing elements and the running surface for the piston as mixing of lubricant and fuel can lead to the injection nozzles becoming gummed up. In the embodiment illustrated there is therefore incorporated the subject matter of a lubricating device such as described in the previously published Patent Application DT-OS No. 2500957.

For this purpose the first injection nozzle 11 is secured in the receiving bore 33 of an insert 34 fitting in the peripheral portion 1 and a space is present between the nozzle 11 and the bore 33 to form an air shield 35. The air shield 35 is in communication with the air supply passage 28 (in FIG. 1) through an air passage 36. A further air passage 38 branches off from the passage 36 at a bore 37 and leads through an outer annular groove 42 provided on the insert 34 and on both sides of the insert 34 is distributed into a respective bore 43 which extends within the peripheral portion 1 parallel to its running surface 2 and through troughs 44 which are provided in the surfaces 7 of the side walls 3, opening into the induction working chamber as can also be seen in FIG. 3. The troughs 44 are arranged axially in a common plane with a first nozzle 11 so that there is always a flow in the same direction towards the working chamber in the passage 36 and in the passage 38 and both passages are cut off simultaneously before the beginning of the compression phase substantially at the same time as the inlet passages 14.

Provided in the air passage 16 between the bore 37 and the air shield 35 there is a restriction 39 and in the passage 38 between the bore 37 and the point of opening into the working chamber there is a restriction 40, these restrictions 39 and 40 having a total cross section corresponding largely to the air requirements at idling. Between the bore 37 and the restriction 40 a lubricant pipe 41 opens into the passage 38 and through it a lubricating oil is fed into the passage 38 from an oil metering pump provided for the purpose but not illustrated. This lubricant introduced into the passage 38 is picked up by the air flow resulting from the depression in the chamber undergoing the induction phase, and carried along the walls of the passage 38 so that when it reaches the restriction 40 the reduction in cross section at this point results in an increased velocity of flow that picks the oil up and passes it immediately into the working chamber. As a consequence of its adhesive properties the lubricant is carried forward along the walls of the passage 38 predominantly in the form of a film so that it can, via the lateral troughs 44, reach both the axial sealing elements that are in sliding contact with the surfaces 7 of the side walls 3 and also the sealing strips 9 and link blocks 10, as well as the radial apex seals 8 which are in sliding contact with the peripheral running surface 2, resulting in reliable lubrication of the seal elements. The flow of air entering the working chamber through the troughs 44 has the further advantage that it comes laterally into contact with the flow of fuel emerging from the first nozzle 11 and can achieve additional turbulence.

In contrast to the embodiment described, in which the idling air flow is distributed between the air passage 36 and the passage 38 for introducing lubricant, the injection nozzle 11 can obviously be mounted in the peripheral portion 1 of the insert 34 without this distribution feature, i.e. without the passage 38 and the lubricating device. In this case the idling air reaches the working chamber soley through the passage 36 and the air shield 35.

Figure 3:
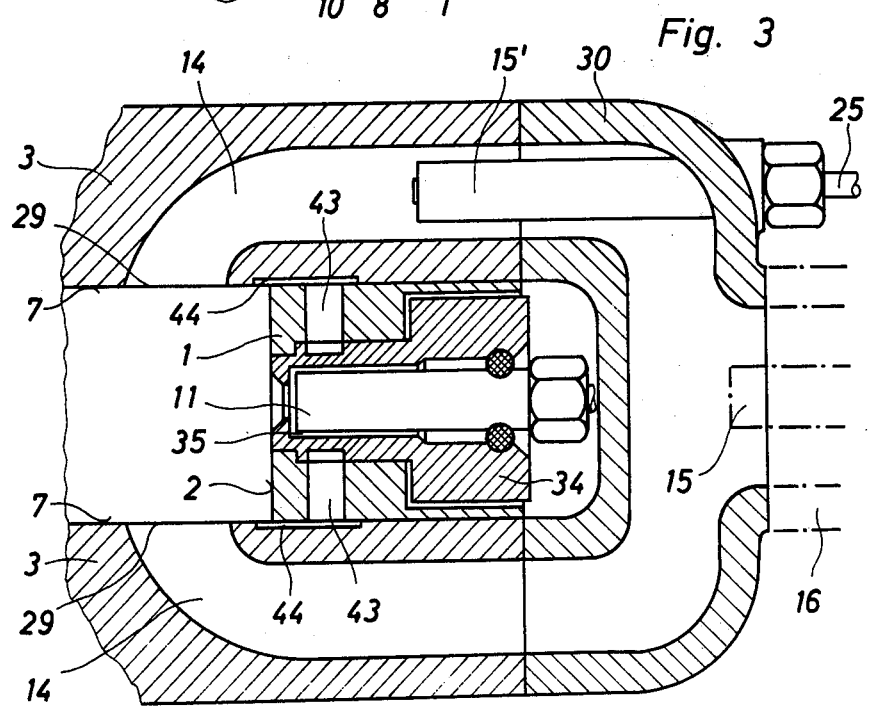
FIG. 3 is a longitudinal section through the housing on the line III—III in FIG. 2 with a branch piece connected to the inlet passages.

In FIG. 3 is illustrated the engine with inlet passages 14 arranged in both the side walls 3 and connected through the transverse part of the branch piece 30 to the common induction pipe 16. In this illustration there is shown the provision of the second injection nozzle 15' in one of the two inlet passages 14, whilst the other passage 14 serves solely to carry air when the engine is running.

It would however also be possible to mount the second nozzle 15 in the branch piece 30 at the induction pipe 16 or upstream of this point as indicated in broken lines so that, when fuel is delivered by the nozzle 15 the mixture can enter the working chamber through both of the inlet passages 14.

We claim:

1. A fuel injection rotary piston internal combustion engine of the trochoidal type with a housing made up of a peripheral portion and two side walls and with a first injection nozzle in the peripheral portion an inlet passage being provided in each of the side walls and a second injection nozzle mounted in one of the inlet passages, whilst the other inlet passage carries only air, the nozzles being connected to a fuel delivery device and being of variable injection delivery, the first nozzle being mounted at a point in the peripheral portion which lies in the working chamber that is undergoing the induction phase and being in the form of an airshielded nozzle of which the shielding air opening being so constructed and arranged to provide a cross-section corresponding to at least a major part of the idling air requirements, and a continuous injection fuel delivery means for feeding a quantity of fuel proportional to the quantity of air drawing in, and connected to the first injection nozzle and the second nozzle.

2. An engine according to claim 1 in which control means are interposed between the second nozzle and the fuel delivery means for controlling the connection of the second nozzle to the fuel delivery means.

3. An engine according to claim 2 in which the control is obtained by a valve means coupled to a throttle valve.

4. Rotary piston engine according to claim 1 characterised in that the air shield of the first injection nozzle has a cross section for flow of about 80% of the idling air requirements.

5. An engine according to claim 1 in which the first injection nozzle is so constructed and arranged to pass a quantity of fuel corresponding to about 50 to 70% of full load requirements.

* * * * *